United States Patent
Itoi

(10) Patent No.: US 7,844,827 B1
(45) Date of Patent: Nov. 30, 2010

(54) METHOD OF KEY GENERATION USING BIOMETRIC FEATURES

(75) Inventor: Naomaru Itoi, Menlo Park, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 1157 days.

(21) Appl. No.: 11/496,762

(22) Filed: Jul. 31, 2006

Related U.S. Application Data

(60) Provisional application No. 60/705,986, filed on Aug. 4, 2005.

(51) Int. Cl.
*G06F 21/00* (2006.01)

(52) U.S. Cl. .................................................. 713/186
(58) Field of Classification Search ........................ None
See application file for complete search history.

(56) References Cited

U.S. PATENT DOCUMENTS

| | | | |
|---|---|---|---|
| 2005/0259844 A1* | 11/2005 | Kot et al. | 382/100 |
| 2009/0226052 A1* | 9/2009 | Fedele et al. | 382/125 |

* cited by examiner

*Primary Examiner*—Brandon S Hoffman
(74) *Attorney, Agent, or Firm*—Philip H. Albert; Townsend and Townsend and Crew, LLP

(57) ABSTRACT

A system and method for generating an encryption key using physical characteristics of a biometric sample is described. In one embodiment, the biometric feature(s) from a sample are analyzed to generate a feature vector. After discretizing the feature(s), the resultant feature vector is translated into a bit vector. The bit vector is the secure biometric key that results from the biometric(s). The secure biometric key is used to generate at least one cryptographic key. A similar process is used to access the cryptographic key secured by the secure biometric key. If the access biometric key matches the secure biometric key, the cryptographic key is revealed and access is allowed. In another embodiment, if the access biometric key does not match the secure biometric key a camouflaging process is used to provide an unauthorized user a bogus secure biometric key indistinguishable from the correct secure biometric key.

25 Claims, 4 Drawing Sheets

METHOD OF KEY GENERATION USING BIOMETRIC FEATURES

CROSS-REFERENCES TO RELATED APPLICATIONS

This application claims priority to U.S. Provisional Patent Application No. 60/705,986 filed Aug. 4, 2005, entitled "Method Of Key Generation Using Biometric Features", which is hereby incorporated by reference in its entirety.

BACKGROUND

The present invention relates to the field of biometric identification, and in particular to methods and apparatus for deriving encryption keys from biometric data.

Numerous techniques have been proposed in the literature to deal with the problem of identity theft. Any such scheme tries to establish that a person is who she/he claims to be. Passwords, (long) private keys, and camouflaging are some of the approaches used for this purpose. Since human beings cannot remember long keys, private keys often tend to be stored in a wallet encrypted by possibly a small password. Unfortunately, all of these schemes have the property that someone who carries these credentials (such as the right keys and passwords) will be accepted as the right person even if these credentials have been stolen from others.

As a biometric is a biological characteristic (such as a fingerprint, the geometry of a hand, Retina pattern, iris shape, etc.) of an individual, conventional biometric techniques have been used by the security industry as an additional verification factor as biometrics are usually more difficult to obtain than other non-biometric credentials. Biometrics are often used for identification, as well as authentication.

Generally, biometrics in the context of identification and authentication are utilized in a two stage process. The first stage is generally referred to as enrollment. In the enrollment stage samples of appropriate biometric(s) are collected from an individual. These biometrics are analyzed and processed to extract features (or characteristics) present in each sample. The set of features present in the biometric of an individual constitutes a template for the person. These templates are then stored to complete the enrolment stage. In the second stage the same biometric of the individual is measured. Features from this biometric are extracted just like in the enrollment phase to obtain a template. If the goal is identification, then this template is searched for in the database of templates generated in the first phase. If a match occurs, the identification of the individual is revealed, otherwise identification fails. If the goal is authentication, then the template generated in the second stage is compared with the template generated in the first stage for the claimed person. If a match occurs, authentication is successful, otherwise authentication fails.

The industry has also attempted to generate cryptographic keys using biometric data. Generating a cryptographic key from biometric information is a beneficial idea because only the owner of the biometric information can recover the key. Additionally, the key does not have to be stored anywhere, and provides the "what-you-are factor" in user authentication.

Many have tried to develop a way to reliably generate a key from biometric information. Examples of current Biometric encryption disclose linking biometric information to generation of a cryptographic key. Such conventional approaches rely on mathematical characteristics of biometric information to generate the cryptographic key. Unfortunately, conventional techniques to obtain a cryptographically strong cryptographic key (e.g., 128 bit symmetric key or 1024 bit asymmetric key) require a significant amount of biometric data, or greater details from biometric samples is required. Requiring a significant amount of biometric data burdens a user with submitting many biometric samples. Requiring greater details from biometric samples requires fine-grained, precise feature extraction from a biometric sample, which is a difficult task employing conventional technology.

Therefore, what is needed is a method and apparatus capable of generating a cryptographic key using biometric data in an easy to implement but effective manner.

BRIEF SUMMARY

Embodiments of the present invention provide a method and apparatus for generating cryptographic keys using biometric data. In one embodiment the present invention provides a method for generating a cryptographic key using biometric data. The method includes segmenting an image of a biometric into at least two quadrants, detecting at least one biometric feature associated with the biometric, determining which of the at least two quadrants the feature is located in, generating a subkey value from a quadrant location value derived from the quadrant the at least one feature is located in and a biometric feature type, and generating a cryptographic biometric key by concatenating the subkey value with a predetermined number of other subkey values derived from other quadrant location values and other feature types associated with other biometric features of the biometric.

In one embodiment the present invention provides a method of using biometric data to provide access to an access controlled system. The method includes establishing an image map defining a plurality of image quadrants, aligning an image of a first biometric sample to the image map, rotating the image of the first biometric sample or image map by one or more offset angles derived from one or more biometric features of a second biometric sample, determining which of the quadrants of the image map the biometric features of the first biometric sample are located in, generating a subkey vector value for each biometric feature of the first biometric sample by combining an index value of a respective quadrant where a respective biometric feature from the first biometric sample is located, the offset angle of a respective biometric feature from the second biometric sample, and a feature type value of the respective biometric feature from the first biometric sample, to form a first set of subkey vector values and computing an access biometric key from the first set of subkey vector values.

In one embodiment the present invention provides a system having biometric access control. The system includes a processor and a computer readable storage medium coupled to the processor. The computer readable storage medium includes code for aligning an image of a biometric sample to an image map defining a plurality of image quadrants, code for determining which of the image quadrants biometric features of the biometric sample are located in, code for generating a subkey vector value for each biometric feature of the biometric sample by combining an index value of a respective quadrant where a respective biometric feature is located, an offset angle of the respective biometric feature relative to a predetermined reference point, and a feature type value of the respective biometric feature, to form a set of subkey vector values, and code for generating a biometric access key from the set of subkey vector values.

DETAILED DESCRIPTION OF EXEMPLARY EMBODIMENTS

Embodiments of the present invention provide an apparatus and method for generating a cryptographic key (e.g., short key) using biometric data. In one embodiment, during an enrollment stage one or more biometric features are obtained from a user. The biometric features are stored as a template along with the biometric feature type and location with respect to a normalized angle. Based on the biometric feature type and location, biometric features are then descretized into biometric feature vectors that generate a bit vector representing a cryptographic key. During a verification stage, using a similar process from above, biometric data from a user is descretized into feature vectors that generate a bit vector representing another cryptographic key for a user.

In the verification stage, a similar process is used as in the enrollment stage to generate an access biometric key. This generated access biometric key is used to uncover the cryptographic key generated from the enrollment stage. If the access biometric key is correct, the secured cryptographic key is provided to the user. Otherwise, if the access biometric key is not correct, the cryptographic key is not provided to the user or may be camouflaged. If camouflaging is used, the user will receive an access biometric key which is different from the correct access biometric key but which is structurally indistinguishable from the correct access biometric key. A short version of the cryptographic key may be used for any number of purposes such as a PIN number in PIN based cryptographic algorithms.

Figure 1:
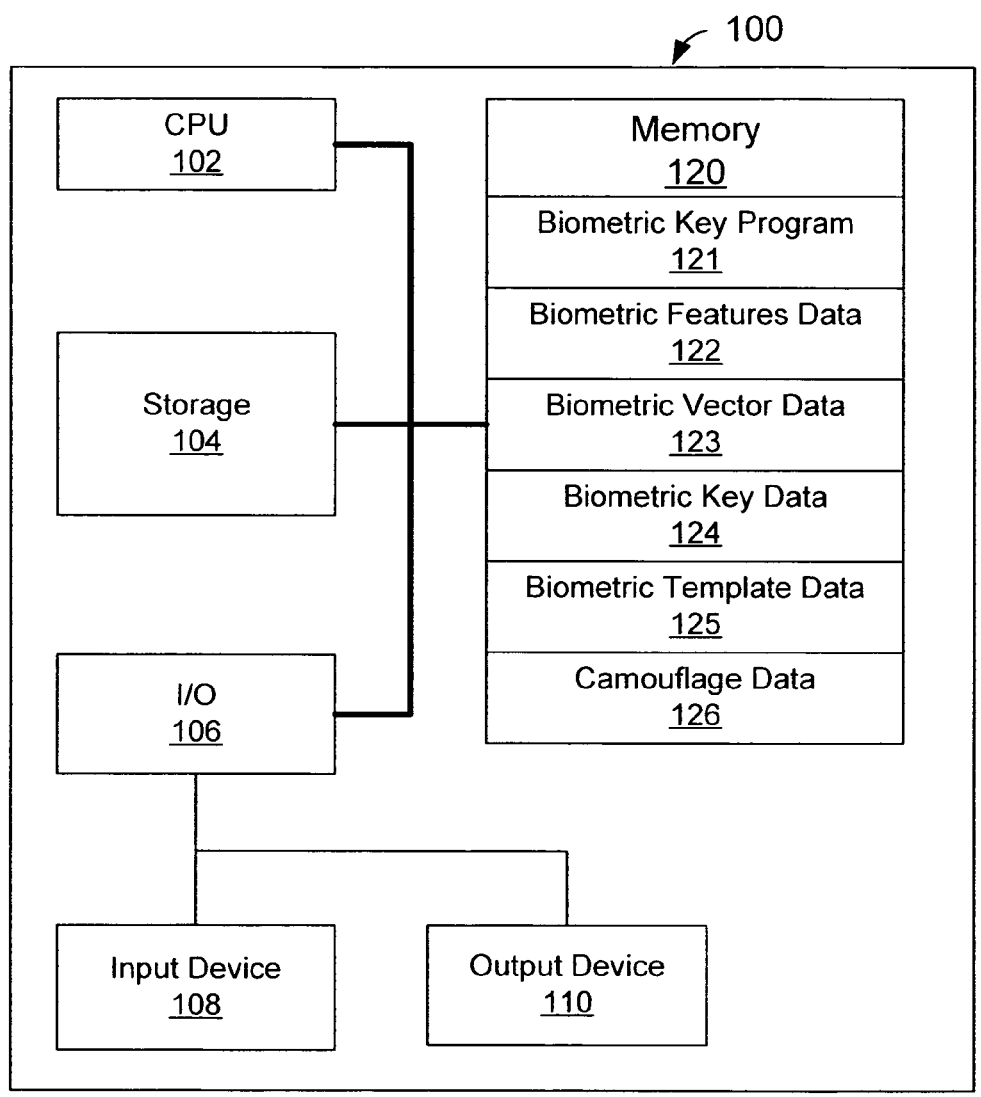
FIG. 1 is a high level diagram of one embodiment of a processing system for processing biometric features in accordance with embodiments of the invention.

FIG. 1 is a high level diagram of one embodiment of a processing system 100 for processing biometric features. Processing system 100 includes a Central Processing Unit (CPU) 102, data storage 104, input/output interface 106, input device 108, output device 110, and memory 120. CPU can be any type of suitable processor. Data storage may be any number of hardware storage devices such as disk drives, tape drives and the like. Input device 108, may be any input device capable of receiving input from a user or system such as a computer keyboard device, biometric sensor, and the like. Output device 110 may be any device capable of rendering information to a user thereof. For example, the output device 110 may be a computer monitor, printer, and the like. Memory 120 is preferably random access memory sufficiently large to hold the necessary programming and data structures for use with processing system 100. While memory 120 is shown as a single entity, it should be understood that memory 120 may in fact comprise a plurality of modules, and that memory 120 may exist at multiple levels, from high speed registers and caches to lower speed but larger DRAM chips and may be combined with data storage 104.

Illustratively, memory 120 may include a biometric key program 121 that, when executed on CPU 102, may generate a biometric key, cryptographic key or compare a secure biometric key with an access biometric key as described below. Biometric key program 121 may use any one of a number of different programming languages. For example, the program code can be written in PLC code (e.g., ladder logic), a higher-level language such as C, C++, Java, or a number of other languages. Memory 120 may also contain biometric features data 122, biometric vector data 123, biometric key data 124, biometric template data 125, and camouflage data 126 described herein.

During an enrollment stage as described herein, biometric(s) samples of interest may be collected by processing system 100, for example, using input device 108, which may be a biometric scanning device. In one embodiment, processing system 100 may collect biometric(s) features of interest from biometric samples such as fingerprints, retina pattern, and the like, from the biometric samples. CPU 102 may store the biometric(s) samples of interest for example in memory 120.

For example, consider the case of a fingerprint image. A fingerprint may be characterized by underlying ridges. Locations on the fingerprint where a ridge terminates or bifurcates is called a minutiae. The features of the fingerprint such as the location, type (ridge termination or ridge bifurcation) and angles of minutiae may be stored by processing system 100. In one embodiment, the location of minutiae is stored as a template, and other biometric features of the fingerprint, e.g., types and angles, are used to generate a cryptographic key as is described further below.

In one embodiment, in order to make the biometric features invariant under rotations, displacements, etc. which could alter the integrity of the template, processing system may process the biometric(s) features of interest applying appropriate filters and other operators adapted to prevent the rotation and displacement of the biometric features.

In another embodiment, as described further herein, processing system 100 discretizes the biometric features. For example, consider the features f in biometric(s) samples of interest using the following:

$$f_0, f_1, \ldots, f_q$$

each feature f can take on many possible feature values. These feature values could either be discrete or continuous. In either the discrete case or the continuous case, each feature may be discretized into an appropriate number (t) ranges of values. For example if one of the features is an angle (i.e., a real number) in the range [0, 180) and if t is 18, then the ranges will be [0, 10), [10, 20), . . . , [170, 180).

After suitably discretizing the features, processing system 100 generates a feature vector. For example, using discretization, each feature vector may be represented as a bit sequence of length corresponding to the following formula:

$$q \lceil \log_2 t \rceil \qquad \text{(Eq. 1)}$$

The feature vector is translated into a bit vector. In one embodiment, the bit vector represents a biometric key. The biometric key can then be used to secure other (possibly longer) cryptographic keys. The location data and type of biometric feature employed to generate feature vectors and bit vectors may be stored in memory 120.

In one embodiment, during an access stage as described herein, when a user wants to access the cryptographic key, processing system 100 receives a user inputs biometric input. For example, a user may enter their fingerprint via input device 108. The processing system 100 employs a similar process as the enrollment stage to generate an access biometric key from the user's input biometric data. The processing system 100 compares the access biometric key to the stored cryptographic biometric key. If the access biometric key and secure biometric key match, the cryptographic key may be outputted to the user via output device 110. If the access biometric key and secure biometric key do not match, the user is denied access.

In another embodiment, if the access biometric key and secure biometric key do not match, then the biometric key program 121 camouflages the fact that the biometric features were not correct and generates a bogus (e.g., camouflaged) secure biometric key that is indistinguishable from the correct secure biometric key.

Template Enrollment

Figure 2:
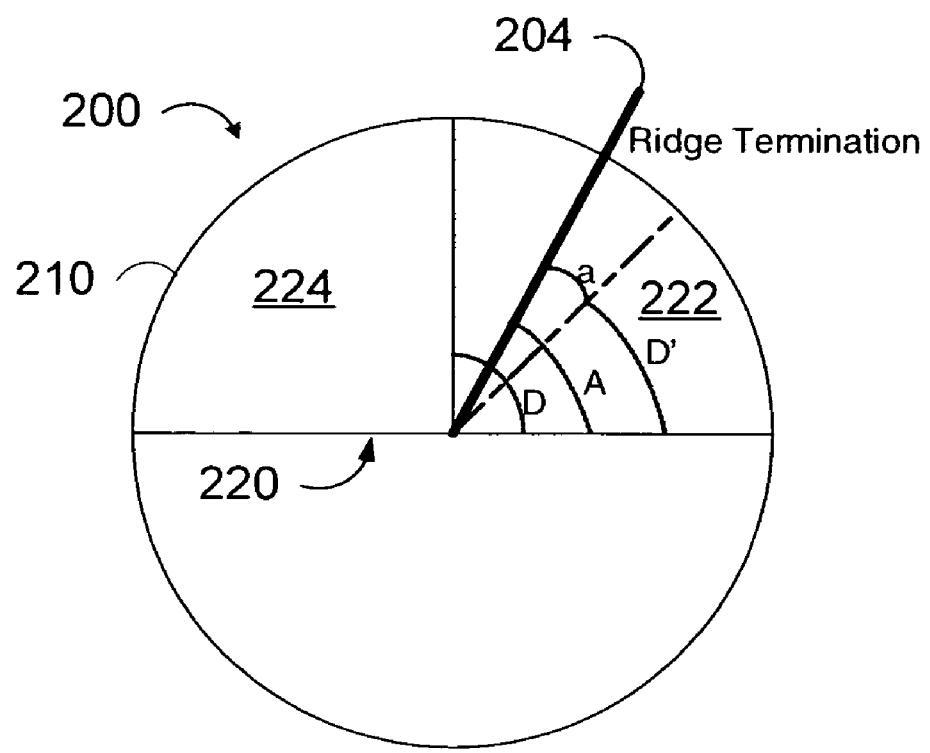
FIG. 2 is a high level diagram of one embodiment of fingerprint minutiae location variables on an image map in accordance with embodiments of the invention.
Figure 3:
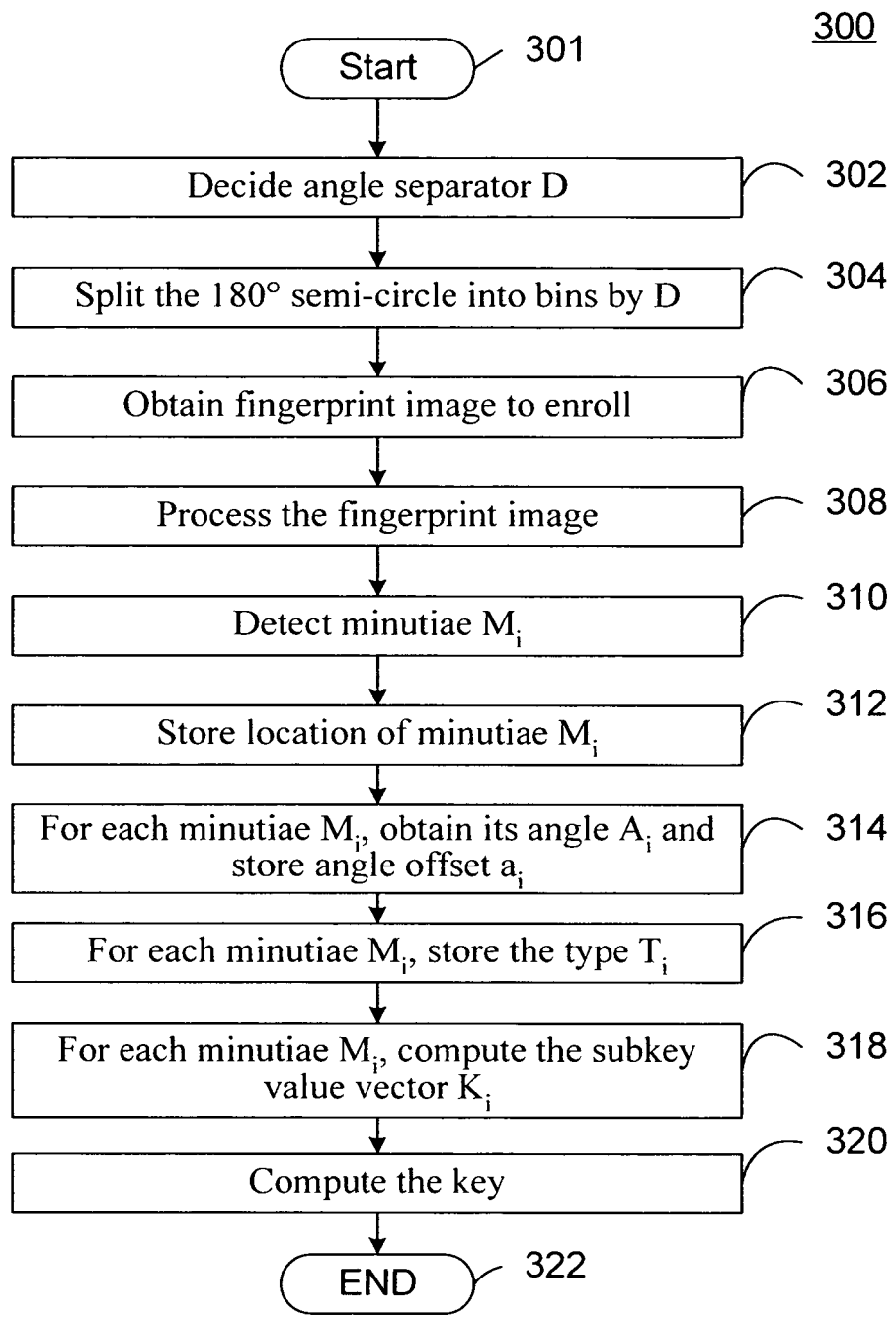
FIG. 3 is a high level flow diagram of one embodiment of a method of enrolling a fingerprint template in accordance with embodiments of the invention.

FIG. 3 is a high level flow diagram of one embodiment of a method 300 of enrolling a biometric template, such as a fingerprint template, used to generate a cryptographic biometric key. In one embodiment, with reference to FIG. 1 and FIG. 2, at step 301 method 300 may be activated by, for example, by operation of processing system 100. For clarity, a fingerprint will be described herein, however, those skilled in the art will appreciate that other types of biometrics may be used. For example, as described herein a user may input other biometric samples such as a thumb print, retina image, and the like, using input device 108.

At step 302, as illustrated in FIG. 2, an image map 200 includes a semicircle 210 which includes an angle separator D. Angle separator D divides semicircle 210 by a predetermined angle (e.g., 22.5°) used to define bins 215 which may be considered quadrants of the semicircle 210. Angle separator D may take on any suitable value. For example consider the case where angle separator D is 22.5°. Method 300 may split the 180° semi-circle 210 into bins according to angle separator D at step 304 that correspond to 22.5° (e.g., 0°-22.5°, 22.5°-45°, 45°-67.5°, 67.5°-90°, 90°-112.5°, 112.5°-135°, 135°-157.5°, 157.5°-180°.

At step 306, a fingerprint sample is obtained to enroll. In one embodiment, the fingerprint may be obtained though a scanning device, such as a biometric scanner, or may also be obtained by a user transmitting an image of the user's fingerprint from an external source such as a database. For example, a user supplies a fingerprint to processing system 100 for enrollment via input device 108. In one embodiment, a thermal image of the fingerprint may be used derived for example from a thermal scan of the fingerprint.

At step 308 the fingerprint image is processed using processes such as filtering, enhancement, segmentation, thinning, etc. to make the image invariant to rotation and displacement. For example, such processing may be done using a Hough transformation as is known to help make the fingerprint image invariant to rotation and displacement. In one embodiment, a bit map is produced that is subsequently filtered and enhanced to accentuate the biometric features of the fingerprint. In other embodiments, images are processed using spectral analysis to form a topographic map of the user's fingerprint. Such processing may be adapted to provide a biometric rotational orientation to prevent the image from being skewed.

At step 310, minutiae 204 (e.g., ridge termination and ridge bifurcation) are detected. The location of minutiae 204 may be stored at step 312, for example, in biometric features data 122. In one embodiment, minutiae 204 are detected using a scanning process. The scanning process may detect minutiae 204 using differences in pixel value, or may use other types of image detection and enhancement as known in the art.

Illustratively, FIG. 2, illustrates image map 200 including minutiae 204 of a fingerprint sample, which in this illustration is a ridge termination of the fingerprint image disposed in semi-circle 210. Semi-circle 210 is divided into two bins 222 and 224 where bin 222 is 0°-90° and bin 224 is 90°-180°. FIG. 2 further illustrates the variables described below, for example angle separator D=90°, the middle of the bin 224 is defined as D'=45°, the angle of the biometric feature f relative to the bin range (e.g., 0°-90°) is defined as A=60°, the offset from D' is denoted as a=15°. In this example, $K_{i,0}=0$ because minutiae 204 is in the first bin 222. $K_{i,1}=0$ because this minutiae 204 is a ridge termination type of biometric feature. In one embodiment, D' may be considered another separator that divides bin 224 into sub-quadrants.

At step 314, an angle $A_i$ is obtained for each minutiae $M_i$ 204. Angle $A_i$ may be a relative angle associated with the angle range of the bin minutiae $M_i$ 204 is located in. For example, for bin 222 having a range of 0°-90°, the angle $A_i$ is for minutiae $M_i$ 204 may be relative to 0°, however, the present invention may employ other relationships such as angle $A_i$ being compared to another reference point associated with semi-circle 210.

An angle offset $a_i=A_i-D'$ is determined at step 314. Advantageously, such an offset angle $a_i$ provides further location information for minutiae $M_i$ 204 within bin 222, without the need for specific coordinates. For example, if D is 22.5° and $A_i$ is 10°, D' would be 11.25°, and angle offset $a_i$ would be −1.25°. As described further below, angle offset $a_i$ may be used as an offset to rotate comparison minutiae in order to determine if the enrolled minutiae $M_i$ 204 matches the comparison minutiae to within a predefined tolerance range.

At step 316, the type $T_i$ (ridge termination or ridge bifurcation) of minutiae $M_i$ 204 is determined and stored for example in memory 204. In one embodiment, processing system 100 may utilize a pattern matching program or other type of process to determine the minutiae type. For example, with regards to fingerprints, processing system 100 may search a database of fingerprint features and compare those fingerprint features to minutiae $M_i$ 204 to determine the type $T_i$ of the minutiae is a ridge termination or a ridge bifurcation.

For each minutiae $M_i$ 204, the subkey value vector (e.g., 4 bit vector) $K_i$ is computed at step 318 by employing angle $A_i$ and type $T_i$ as described below. In one embodiment, the index of bin 215 that angle $A_i$ intersects is determined. The index may be a bin label such as bin 000, bin 001, bin 002, and so forth. In this example, bin 222 has an index value of 000. The index may provide a portion of a PIN component. For example, the index may provide the first three bits of a subkey value vector $K_i$.

In one embodiment, the last bit of $K_i$ may be computed from the type of biometric feature, such as a fingerprint ridge termination or ridge bifurcation. As illustrated in FIG. 2, minutiae $M_i$ 204 is a ridge termination and therefore the value of $K_i$ may be computed using the value given to a ridge termination. Illustratively, in this example, if type $T_i$ is a ridge termination then the last bit of $K_i$ is set to 0. If it is a ridge bifurcation, the last bit is set to 1. Therefore, in this example, as the type of biometric feature is a ridge termination, last bit of $K_i$ would be set to 0.

$K_i$ for this example, is as follows:

$K_{i,0}$ is 0 as minutiae Mi 204 is in a first bin 222
$K_{i,1}$ is 0 as minutiae Mi 204 is a ridge termination At step 320, a biometric key is generated by computing a parity code vector (e.g., odd or even parity). In one embodiment, the parity code vector is stored as an enrolled biometric key $P_e$ which represents a cryptographic key or portion thereof, derived from one or more subkeys $K_i$. Advantageously, such an enrolled biometric key $P_e$ has a significant encryption strength that is generated using a small number of biometric features f.

For example, at step 320, an odd parity code version enrolled biometric key $P_e$ may be computed by:

$$P_e = K_1 + K_2 + \ldots + K_n + (1, 1, 1, 1) \quad \text{(Eq. 2)}$$

where "+" denotes Exclusive OR operation, and (1, 1, 1, 1) means a 4 bit vector in which the value of every bit is 1. At step 322, method 300 ends.

Access Key Generation

Figure 4:
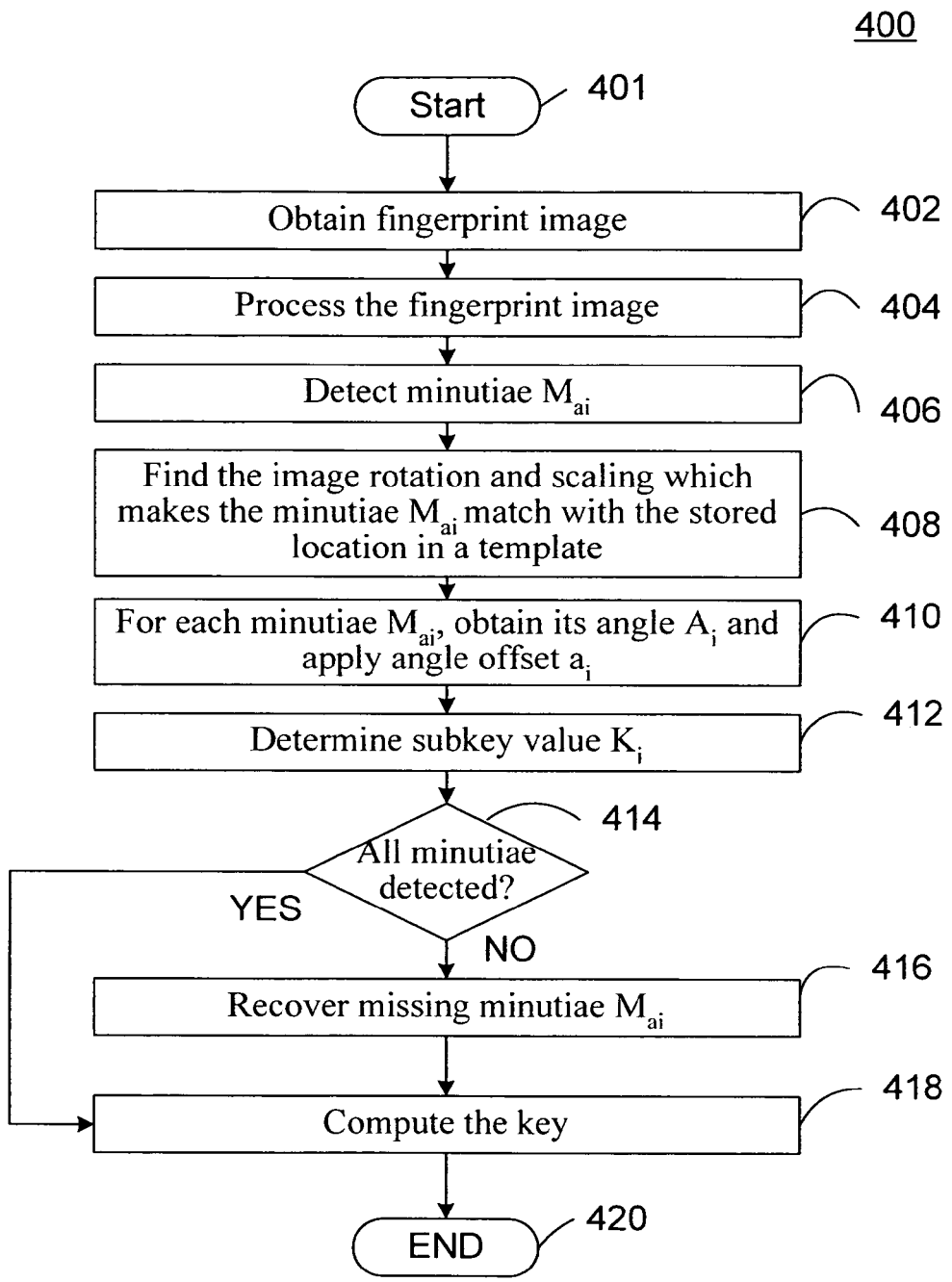
FIG. 4 is a high level flow diagram of one embodiment of a method to generate a biometric access key from a fingerprint image in accordance with embodiments of the invention.

FIG. 4 is a high level flow diagram of one embodiment of a method 400 to generate a key from a fingerprint image. At step 401 the method 400 may be activated by, for example, by operation of processing system 100. At step 402, an access fingerprint image is obtained, for example, via input device 108. In one embodiment, as described above the access fingerprint may be obtained though a scanning device, such as a biometric scanner, or may also be obtained by a user transmitting an image of the user's fingerprint from an external source such as a database.

At step 404, similar to the fingerprint image use during the enrollment stage, the access fingerprint image is processed using processes such as filtering, enhancement, segmentation, thinning, etc. to make the image invariant to rotation and displacement (e.g., Hough transformation). In one embodiment, as discussed above, a bit map is produced that is subsequently filtered and enhanced to accentuate the biometric features of the access fingerprint. In other embodiments, images are processed using spectral analysis to form a topographic map of the user's fingerprint. Such processing may be adapted to provide a biometric rotational orientation to prevent the image from being skewed.

Access minutiae $M_{ai}$ from the access fingerprint are detected for example by processing system 100 at step 406 using a biometric scanning process. As described above, the scanning process may detect access minutiae $M_{ai}$ using differences in pixel value, or may use other types of image detection and enhancement as known in the art. For example, a thermal image may show biometric features at one level of image intensity value relative to other biometric features. In other embodiments, only specific types of biometric features are detected. For example, for a fingerprint only ridge terminations and ridge bifurcation may be detected while other features such as wrinkles, scars, etc., may be ignored.

At step 408, the access fingerprint image is rotated and scaled to find a match between the enrolled minutiae $M_i$ 204 stored, for example, in biometric template data 125. In one embodiment, biometric features are scaled such that they are within a predetermined image size. For example, as different biometric scanners may produce images of ridge terminations that vary according to the setting and resolution of the biometric scanner, enrolled minutiae $M_i$ 204 may be resized to match the size and resolution of access minutiae $M_{ai}$. Conversely, access minutiae $M_{ai}$ may be resized to match the size and resolution of the enrolled minutiae $M_i$ 204. In one embodiment, once the minutiae are scaled, a pattern matching process is invoked to find a matching template within a desired degree of accuracy.

At step 410, similar to and referring to image map 200 described above, for each access minutiae $M_{ai}$ detected, an angle $A_i$ is obtained. As described above, angle $A_i$ may be a relative angle associated with the angle range of the bin where minutiae are located. For example, using image map 200, for bin 222 having a range of 0°-90°, the angle $A_i$ for access minutiae $M_{ai}$ may be determined relative to 0° or to another angle such as 90°.

An angle offset $a_i$ is applied to bins 215 at step 410. In one embodiment, angle offsets $a_i$ from matching enrolled minutiae $M_i$ 204 are applied by rotating bins 215 to the left (i.e., semi-circle 210 is rotated counterclockwise) by the amount of a matching enrolled minutiae $M_i$ 204. If $a_i$ is less than 0, bins 215 are rotated to the right (i.e., semi-circle 210 is rotated clockwise) by $a_i$. In one embodiment, rotating bins 215 by $a_i$ places the access minutiae $M_{ai}$ in a particular bin 215 such that if the access minutiae $M_{ai}$ where from the same fingerprint, the access minutiae $M_{ai}$ would be located in the same bin 215 as the enrolled minutiae $M_i$ 204. In other words, rotating bins 215 (or image of access minutiae $M_{ai}$) the same offset angle $a_i$ as a matching enrolled minutiae $M_i$ 204, places access minutiae $M_{ai}$ in the same bins 215 as the enrolled minutiae $M_i$ 204.

Similar to method 300 above, at step 412, the subkey value vector (e.g., 4 bit vector) $K_{ai}$ is computed from $A_i$ and $T_i$, by selecting the bin which $A_i$ falls into for each access minutiae $M_{ai}$. As described above, the index of bin 215 that $A_i$ is disposed in is determined. The index may be a bin label such as bin 000, bin 001, bin 002, and so forth. In this example, bin 222 has an index value of 000. The index may provide a portion of a PIN component. For example, the index may provide the first three bits of a subkey value vector $K_{ai}$.

In one embodiment, the last bit of $K_{ai}$ may be computed from the type of biometric feature, such as a fingerprint ridge termination or ridge bifurcation. Illustratively, in this example, if type $T_i$ is a ridge termination then the last bit of $K_{ai}$ is set to 0. If it is a ridge bifurcation, the last bit is set to 1. Therefore, in this example, as the type of biometric feature is a ridge termination, last bit of $K_{ai}$ would be set to 0.

Consider where access minutiae $M_{ai}$=enrolled minutiae $M_i$ 204, $K_{ai}$ in this example is as follows:

$K_{ai,0}$ is 0 as access minutiae $M_{ai}$ is in a first bin 222

$K_{ai,1}$ is 0 as access minutiae $M_{ai}$ is a ridge termination

At step 414, if all access minutiae $M_{ai}$ are not detected, or not matched with the template, at step 416, the method 400 can recover from one missing minutiae. Assuming $M_j$ is the missing minutiae, compute its value as follows:

$$K_j = (1, 1, 1, 1) + P + \Sigma_{i \neq j} K_{ai} \quad \text{(Eq. 3)}$$

where "+" denotes Exclusive OR operation, and (1, 1, 1, 1) means a 4 bit vector in which the value of every bit is 1. In one embodiment, recovery from more than 1 missing minutiae is accomplished by processing two or more parity codes.

At step 418 method 400 concatenates $K_{ai}$ from 1 to n compute the cryptographic access biometric key $P_a$. For example, an odd access parity code may be computed and used as the access biometric key $P_a$:

$$P_a = K_{1a} + K_{2a} + \ldots + K_{na} + (1, 1, 1, 1) \quad \text{(Eq. 4)}$$

where "+" denotes Exclusive OR operation, and (1, 1, 1, 1) means a 4 bit vector in which the value of every bit is 1.

In one embodiment, access biometric key $P_a$ is a cryptographic key that used to compare to cryptographic key $P_e$ described above. For example, if access biometric key $P_a$ equals $P_e$ then a user may gain access. In another embodiment, if the access biometric key $P_a$ does not match the enrolled biometric key $P_e$ a camouflaging process is used to provide an unauthorized user a bogus secure biometric key indistinguishable from the correct secure biometric key. At step 420, method 400 ends.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for generating a cryptographic key using biometric data, the method comprising:
    segmenting an image of a biometric into at least two quadrants;
    detecting at least one biometric feature associated with the biometric;
    determining which of the at least two quadrants the feature is located in;
    generating a subkey value from a quadrant location value derived from the quadrant the at least one feature is located in and a biometric feature type; and
    generating a cryptographic biometric key by concatenating the subkey value with a predetermined number of other subkey values derived from other quadrant location values and other feature types associated with other biometric features of the biometric.

2. The method of claim 1, wherein the biometric comprises a fingerprint.

3. The method of claim 2, wherein the biometric feature comprises a minutiae.

4. The method of claim 3, wherein the minutiae comprises a ridge termination or a ridge bifurcation.

5. The method of claim 1, wherein segmenting comprises dividing at least one of the two quadrants into sub-quadrants.

6. The method of claim 1, wherein detecting the at least one feature comprises processing the image to establish an image map.

7. The method of claim 1, wherein determining which of the quadrants the biometric feature is located in comprises establishing a semicircle that includes two or more quadrants defined by a separator.

8. The method of claim 1, wherein generating the subkey value comprises determining an offset angle with respect to a reference angle.

9. The method of claim 1, wherein generating the subkey value comprises determining an index of the quadrant the biometric feature is located in.

10. The method of claim 1, further comprising storing the image of the biometric and subkey values as a biometric template.

11. A method of using biometric data to provide access to an access controlled system, the method comprising:
    establishing an image map defining a plurality of image quadrants;
    aligning an image of a first biometric sample to the image map;
    rotating the image of the first biometric sample or image map by one or more offset angles derived from one or more biometric features of a second biometric sample;
    determining which of the quadrants of the image map the biometric features of the first biometric sample are located in;
    generating a subkey vector value for each biometric feature of the first biometric sample by combining an index value of a respective quadrant where a respective biometric feature from the first biometric sample is located, the offset angle of a respective biometric feature from the second biometric sample, and a feature type value of the respective biometric feature from the first biometric sample, to form a first set of subkey vector values; and
    computing an access biometric key from the first set of subkey vector values.

12. The method of claim 11, further comprising allowing access to the system if the access biometric key matches a second biometric key derived using a second set of subkey vector values generated from the second biometric sample.

13. The method of claim 12, wherein computing the access biometric key comprises generating a parity code from the first set of subkey vector values.

14. The method of claim 12, wherein allowing access comprises generating a parity code from the second set of subkey vector values.

15. The method of claim 11, wherein aligning the image comprises processing the image map to make the image of the first biometric sample invariant to rotation or displacement.

16. The method of claim 11, further comprising dividing at least one image quadrant into image sub-quadrants.

17. The method of claim 11, wherein rotating comprises determining a reference point on the image map, wherein the image is rotated by a respective offset angle relative to the reference point of the image map.

18. The method of claim 11, wherein rotating comprises determining a reference point on the biometric image, wherein the image map is rotated by a respective offset angle relative to the reference point on the biometric image.

19. The method of claim 11, computing the access biometric key comprises performing an exclusive OR operation of the first series of subkey vector values each including a quadrant index and type of biometric feature.

20. A system having biometric access control, the system comprising:
    a processor;
    a computer readable storage medium coupled to the processor, wherein the computer readable storage medium comprises:
        code for aligning an image of a biometric sample to an image map defining a plurality of image quadrants;
        code for determining which of the image quadrants biometric features of the biometric sample are located in;
        code for generating a subkey vector value for each biometric feature of the biometric sample by combining an index value of a respective quadrant where a respective biometric feature is located, an offset angle of the respective biometric feature relative to a predetermined reference point, and a feature type value of the respective biometric feature, to form a set of subkey vector values; and code for generating a biometric access key from the set of subkey vector values.

21. The system of claim 20, wherein the code for aligning the image of the biometric sample to the image map comprises processing the image to make the image of the biometric sample invariant to rotation or displacement.

22. The system of claim 20, wherein the code for generating the subkey vector value comprises code for determining an offset angle for each biometric feature relative to a reference point located in a respective quadrant where the biometric feature is located.

23. The system of claim 20, wherein the code for generating a biometric access key comprises code for generating a parity code from the first set of subkey vector values.

24. The system of claim 20, wherein the predetermined reference point comprises a reference point located within a quadrant where a biometric feature is located.

25. The system of claim 20, wherein the biometric sample comprises a fingerprint.

* * * * *